US011338315B2

(12) United States Patent
Rachow

(10) Patent No.: US 11,338,315 B2
(45) Date of Patent: May 24, 2022

(54) ARTICULATING NOZZLE

(71) Applicant: A. RAYMOND ET CIE, Grenoble (FR)

(72) Inventor: Larry Rachow, Lenox, MI (US)

(73) Assignee: A. RAYMOND ET CIE, Grenoble (FR)

( * ) Notice: Subject to any disclaimer, the term of this patent is extended or adjusted under 35 U.S.C. 154(b) by 225 days.

(21) Appl. No.: 16/731,266

(22) Filed: Dec. 31, 2019

(65) Prior Publication Data

US 2021/0197221 A1    Jul. 1, 2021

(51) Int. Cl.
  *B05B 15/74*   (2018.01)
  *B05B 1/20*    (2006.01)
  *B60S 1/52*    (2006.01)
  *B60S 1/56*    (2006.01)

(52) U.S. Cl.
  CPC .............. *B05B 15/74* (2018.02); *B05B 1/20* (2013.01); *B60S 1/52* (2013.01); *B60S 1/56* (2013.01)

(58) Field of Classification Search
  CPC ....... B05B 1/20; B05B 3/0427; B05B 3/0436; B05B 3/044; B05B 15/72; B05B 15/74; B60S 1/52; B60S 1/522; B60S 1/528; B60S 1/56
  See application file for complete search history.

(56) References Cited

U.S. PATENT DOCUMENTS

| 3,656,691 A * | 4/1972 | Norstrand ................. B60S 1/60 239/284.2 |
| 4,069,976 A * | 1/1978 | Chauvigne ............ B05B 3/0436 239/242 |
| 6,234,410 B1 | 5/2001 | Martin et al. |
| 6,905,078 B1 | 6/2005 | Gattuso et al. |

(Continued)

FOREIGN PATENT DOCUMENTS

DE          3817257 A1    11/1989
DE    102004050673 A1     4/2006
(Continued)

OTHER PUBLICATIONS

Machine assisted English translation of DE102004050673A1 obtained from https://worldwide.espacenet.com on Sep. 26, 2019, 8 pages.

(Continued)

*Primary Examiner* — Darren W Gorman
(74) *Attorney, Agent, or Firm* — Warner Norcross + Judd LLP

(57) ABSTRACT

An improved nozzle assembly includes a housing having an inlet for directing media (e.g. cleaning fluid) into the housing, and a nozzle core rotatably coupled to the housing. The nozzle core includes a sprayer shaft and a vane coupled thereto. The sprayer shaft defines a peripheral outlet, and is adapted for passage of media from the housing through the outlet. The vane is adapted to receive media from the inlet to rotationally bias the nozzle core in a first direction and radially orient the outlet to an activated position. The nozzle (Continued)

core is rotationally biased in a second direction opposite the first to radially orient the outlet to a home position different than the activated position. A system including the nozzle assembly, and methods of using each of the same, are also disclosed.

14 Claims, 11 Drawing Sheets

(56) References Cited

U.S. PATENT DOCUMENTS

| | | | |
|---|---|---|---|
| 9,108,206 B1 | 8/2015 | Bredberg et al. | |
| 9,156,066 B2 * | 10/2015 | Jonas | B60S 1/56 |
| 2003/0066909 A1 * | 4/2003 | Jenkins | B60S 1/603 |
| | | | 239/284.1 |
| 2006/0243823 A1 | 11/2006 | Bachmann et al. | |
| 2010/0224707 A1 | 9/2010 | Rathey et al. | |
| 2011/0101127 A1 | 5/2011 | Beyer et al. | |
| 2018/0257097 A1 * | 9/2018 | Blessing | B05B 1/3006 |
| 2020/0086832 A1 * | 3/2020 | Horibe | B05B 1/267 |

FOREIGN PATENT DOCUMENTS

| | | |
|---|---|---|
| EP | 3293061 B1 | 12/2018 |
| FR | 2965776 A1 | 4/2012 |
| KR | 20040053974 A | 6/2004 |
| KR | 100823838 B1 | 4/2008 |
| KR | 20110061379 A | 6/2011 |
| KR | 101459948 B1 | 11/2014 |
| WO | 2011033223 A1 | 3/2011 |
| WO | 2012138455 A1 | 10/2012 |

OTHER PUBLICATIONS

Machine assisted English translation of FR2965776A1 obtained from https://worldwide.espacenet.com on Sep. 27, 2019, 9 pages.
Machine assisted English translation of KR20040053974A obtained from https://worldwide.espacenet.com on Sep. 27, 2019, 6 pages.
Machine assisted English translation of KR20110061379A obtained from https://worldwide.espacenet.com on Sep. 26, 2019, 6 pages.
Machine assisted English translation of KR100823838B1 obtained from https://worldwide.espacenet.com on Sep. 26, 2019, 4 pages.
Machine assisted English translation of KR101459948B1 obtained from https://worldwide.espacenet.com on Sep. 27, 2019, 10 pages.
Machine assisted English translation of WO2011033223A1 obtained from https://worldwide.espacenet.com on Sep. 27, 2019, 7 pages.
European Search Report, dated May 7, 2021, for EP patent application EP 20215352, a foreign counterpart to U.S. Appl. No. 16/731,266.
Machine assisted English translation of DE3817257A1, Abstract, obtained from https://worldwide.espacenet.com on May 25, 2021, 1 page.
Machine assisted English translation of DE3817257A1, Description, obtained from https://worldwide.espacenet.com on May 25, 2021, 10 pages.

* cited by examiner

ARTICULATING NOZZLE

FIELD OF THE INVENTION

The present disclosure relates generally to cleaning systems and devices and, more specifically, to a washer nozzle assembly and related methods and systems.

BACKGROUND OF THE INVENTION

Various cleaning devices are utilized across myriad industries, and frequently utilize washer nozzles to deliver fluids (e.g. cleaning/washing liquid, etc.) to surfaces. For example, most commercial vehicles include one or more washer nozzles connected to a fluid source and fixed proximal to various structures (e.g. windscreens, windows, headlight lenses, etc.), in order to spray cleaning/washing liquid onto an external surface of the structure to be cleaned. Washer nozzles are also utilized to clean exterior cameras and driver assistance sensors, which are increasing in popularity and frequently available as standard or optional equipment. Self-driving and autonomous vehicles, for example, which are also increasing in popularity and production, typically require an even greater number of cameras and sensors for navigation and guidance, driving and safety, and internal performance as compared to more traditional vehicles. In order to optimize the cleaning process, conventional washer nozzles are typically uniquely arranged on each different type of vehicle, and with respect to each structure to be cleaned, in order to properly direct fluid spray onto a particular region of a surface. Such unique arrangements have led to many developments in installation and post-installation solutions to accommodate the various brand, model, and/or structure-specific mounting options, such as directional nozzle inserts, numerous static and adjustable mounts and fixtures, and shimming/adjustment kits.

Unfortunately, however, conventional washer nozzles and related cleaning devices suffer from numerous drawbacks, including a requisite increase in manufacturing costs and labor, system weight, and number of individualized components needed (e.g. for new models/designs) associated with the solutions outlined above. For example, adjustable components may become decalibrated over time from normal operation, leading to decreased effectiveness of the cleaning process. These drawbacks are especially limiting with respect to cleaning systems for cameras and sensors, particularly those associated with self-driving and/or autonomous vehicular systems, which often require more effective cleaning due to the impact of environmental elements to connected systems that can lose effectiveness and, if uncorrected, lead to impairment of normal system function and/or vehicle operation.

SUMMARY OF THE INVENTION

An improved nozzle assembly is provided. The nozzle assembly comprises a housing, which includes an inlet for directing media into the housing. The nozzle assembly also comprises a nozzle core rotatably coupled to the housing. The nozzle core comprises a sprayer shaft that defines a peripheral outlet and a vane that is coupled to the sprayer shaft. The sprayer shaft is adapted for passage of media from the housing through the outlet. The vane is adapted to receive media from the inlet to rotationally bias the nozzle core in a first direction and radially orient the outlet to an activated position. The nozzle assembly further comprises means for rotationally biasing the nozzle core to in a second direction opposite the first and radially orient the outlet to a home position different than the activated position.

A system comprising the nozzle assembly is also provided. The system comprises a media source operatively coupled to the nozzle assembly, and a sensor disposed adjacent the outlet of the nozzle core such that media passed through the nozzle assembly will contact at least two portions of a surface of the sensor.

These and other features and advantages of the present disclosure will become apparent from the following description of particular embodiments, when viewed in accordance with the accompanying drawings and appended claims.

DETAILED DESCRIPTION OF THE INVENTION

An improved nozzle assembly is provided. As described herein, the nozzle assembly is configured to be connected to a media (e.g. a cleaning fluid) source and disposed near a surface to be cleaned, and adapted to direct a stream of media from the source onto multiple points of impact on the surface. As will be appreciated from the description herein, the nozzle assembly has multiple applications, but is suitable for installation on a vehicle (e.g. proximal a sensor, camera, light, lens, window/windscreen, etc.) to deliver a flow of cleaning media to a surface thereof. Moreover, the unique design and material construction of the nozzle assembly allows for increased cleaning efficacy, decreased calibration and/or maintenance, increased usability and convenience, reduced number of parts, as well as other benefits that will be readily apparent to those of skill in the art in view of the embodiments shown and described herein.

Referring generally to the Figures, wherein like numerals indicate corresponding parts throughout the several views, the nozzle assembly is illustrated and generally designated at 10. Certain features of the nozzle assembly 10 are functional, but can be implemented in different aesthetic configurations.

In general, the nozzle assembly 10 comprises three primary components: a housing 44, a nozzle core 12 rotatably coupled to the housing 44, and means 90 for rotationally biasing the nozzle core 12 to a home position within the housing 44, which components are adapted to be operatively connected together, optionally in a releasable manner, as described in further detail below These structures, features, and functions of the nozzle assembly are described in further detail herein and illustrated by the particular embodiments shown in the Figures and described below. Like the nozzle assembly 10 as a whole, certain features of the nozzle core 12 and the housing 44, individually, are functional, but can be implemented in different aesthetic configurations.

As introduced above, the nozzle assembly 10 includes a nozzle core 12. As described in further detail below general, the nozzle core 12 is rotatably coupled to the housing 44, configured to receive media (e.g. from a media source), and adapted to channel and expel a jet of the media away from the nozzle assembly (e.g. onto a surface to be cleaned).

Figure 3:
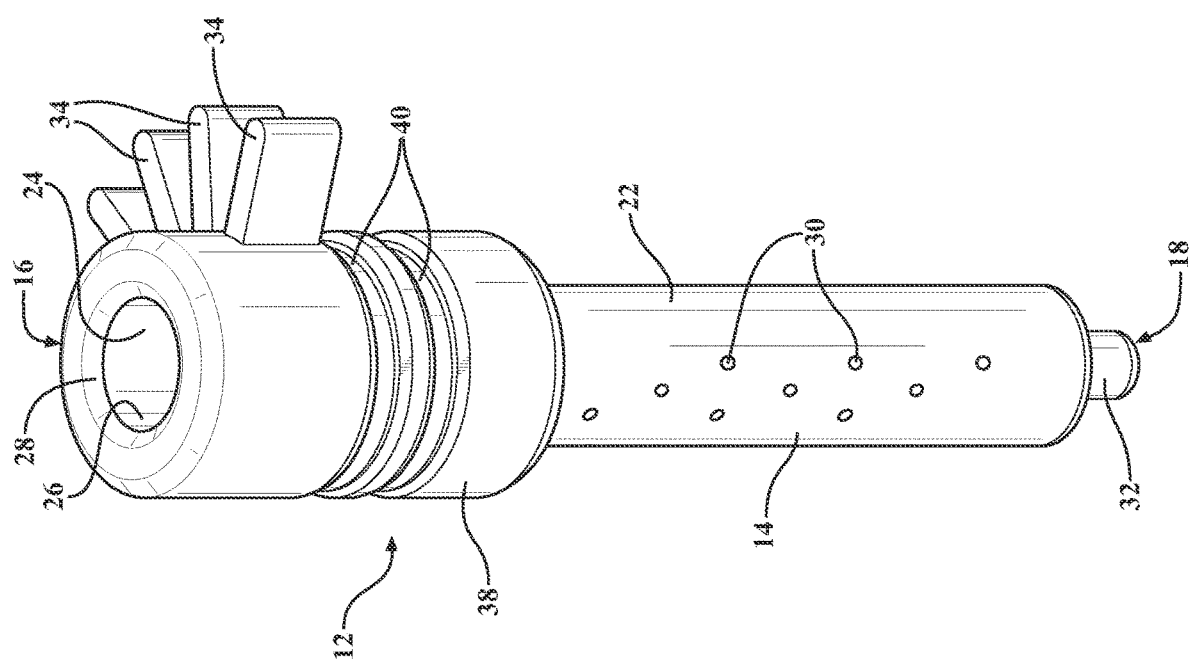
FIG. 3 is an elevated view of a nozzle core of the nozzle assembly.
Figure 4:
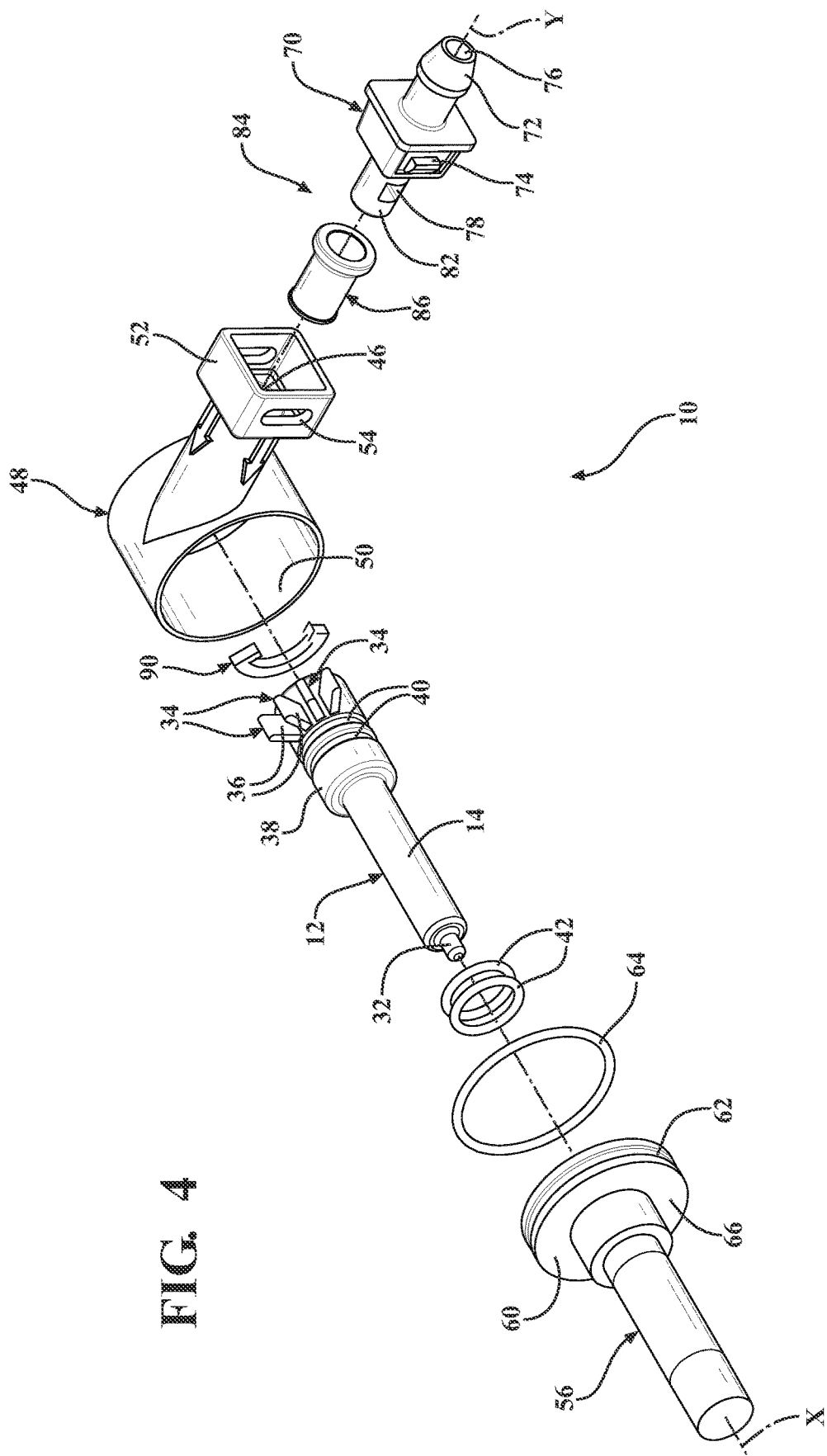
FIG. 4 is an exploded view of the nozzle assembly.

As shown with particularity in FIGS. 3-4, the nozzle core 12 includes a sprayer shaft 14 that extends along a central axis X between a first end 16 and a closed end 18. The sprayer shaft 14 generally includes a side wall 20 that extends between the first end 16 and the second end 18 and presents an exterior surface 22 and an interior surface 24. The exterior surface 22 and the interior surface 24 may independently be textured (e.g. dimpled, etc.) or untextured (e.g. smooth or substantially smooth), continuous (i.e., unbroken) or discontinuous (i.e., may comprise a vent, a port, a door, a window, or other such feature), or combinations thereof. Typically, the interior and exterior surfaces 22, 24 are continuous and substantially smooth, notwithstanding the other features of the sprayer shaft 14 described herein. The shape of the side wall 20, and thus the sprayer shaft 14, may vary, but is typically tubular. In certain embodiments, the sprayer shaft 14 is tubular and generally cylindrical in shape, such that a cross section taken perpendicular to the central axis X comprises a substantially circular shape.

The sprayer shaft 14 may be of any length, i.e., the first and second ends 16, 18 may be separated by any distance along the central axis X (e.g. 5 to 100, alternatively 5 to 50 cm. etc.). The sprayer shaft 14 may also comprise any width, or number of different widths (i.e., exterior most portions of the exterior surface 22 opposite one another about the central axis X may be separated by any distance). For example, in certain embodiments, the sprayer shaft 14 comprises a substantially consistent width as measured along the length of the sprayer shaft 14 (e.g. where the sprayer shaft 14 is substantially tubular in shape). In some embodiments, the width of the sprayer shaft 14 varies, such that the sprayer shaft 14 comprises multiple widths, which may be independently selected. As will be understood by one of skill in the art, the width(s) of the sprayer shaft 14 may be determined by, or may determine, the overall shape of the sprayer shaft 14. As such, the width of the sprayer shaft 14 may be defined based on the shape thereof. For example, in embodiments where the sprayer shaft 14 is substantially tubular in shape, the width may be defined as an overall or outer diameter (i.e., "OD") thereof. In some embodiments, the sprayer shaft 14 comprises a width of from 0.5 to 50 cm, such as from 1 cm to 20, alternatively from 1 to 10 cm.

Regardless of the overall shape of the sprayer shaft 14, the interior surface 24 of the side wall 20 defines an internal duct 26. In general, as will be understood in view of the embodiments described herein, the duct 26 is adapted for axial flow of fluid (e.g. cleaning media) therethrough. As such, the interior surface 24 defining the duct 26 may be bare or coated, e.g. to modify (i.e., increase/decrease) a property thereof, such as lubricity, chemical resistance, toughness, etc. The duct 26 may be of any dimensions, which may be independently selected by varying the shape, length, and/or width of the sprayer shaft 14, the thickness of the side wall 20, the texture of the interior surface 24, etc.

The sprayer shaft 14 includes a port 28 proximal the first end 16 that is in fluid communication with the duct 26. In general, the port 28 is adapted for flow of fluid (e.g. cleaning media) into the duct 26 from outside of the sprayer shaft 14 (e.g. at the first end 16). The port 28 may be of any size and/or shape, and may be integral with, fixed to, and/or otherwise connected and/or fastened to the side wall 20 or another portion of the sprayer shaft 14. As will be understood by those of skill in the art, the diameter of the port 28 may be independently selected, e.g. to control the rate at which media/fluid may be is introduced to the duct 26. In some embodiments, the port 28 is variable in size. Of course, while the port 28 is shown as a single opening at a longitudinal side of the sprayer shaft 14, the sprayer shaft 14 may comprise any number of ports 22 (e.g. 2, 3, 4, or more), which may be independently sized and located about the first end 16 of the sprayer shaft 14 (e.g. on one or more lateral sides, etc.). In such embodiments, each of the ports 28 may be the same as or different from the other (e.g. with respect to shape, diameter, etc.).

The sprayer shaft 14 comprises an outlet 30, which is in fluid communication with the duct 26 and disposed along the length of the sprayer shat 14 between the first and second ends 16, 18. The size and/or shape of the outlet 30 is not limited, and will be generally selected based on the dimensions of the sprayer shat 14 (e.g. the volume of the duct 26) in order to expel media/fluid passed therein as a jet from the outlet 30. The outlet 30 is generally peripherally located on the sprayer shaft 14, such that when the sprayer shaft 14 is tubular and cylindrical, the outlet 30 may be referred to as a radial outlet 30.

The outlet 30 can be configured to produce various spray patterns, e.g. a fan spray, a jet spray, etc. In certain embodiments, a spray-building element (e.g. an insert, limiter, director, rotator, etc.) can be provided at the outlet 30 to achieving or otherwise configure/produce particular other spray patterns (e.g. focused/directed jet sprays, oscillating sprays, combinations of jet and fan sprays, etc.). However, it will be appreciated that the outlet 30 may, instead of producing a spray of fluid (e.g. cleaning media) disposed therethough, dispense a stream of fluid away from the nozzle assembly 10.

It is to be appreciated that the sprayer shaft 14 may comprise any number of outlets 30 (e.g. 2, 3, 4, or more), which may be independently sized and located about periphery of the sprayer shaft 14. In such embodiments, each of the outlets 30 may be the same as or different from the other (e.g. with respect to shape, diameter, etc.). Typically, each of the outlets 30 is arranged along a row and/or column on a portion of the periphery of the sprayer shaft 14, such that fluid (e.g. cleaning media) passed therethrough will be directed from the outlets in a common or at least similar direction. For example, in certain embodiments the sprayer shaft 14 comprises at least two outlets 30 arranged disposed in a longitudinal row along a length of the sidewall 20, and/or at least two outlets 30 disposed in a column along a circumference of the sprayer shaft.

Typically, the second end 18 of the sprayer shaft 14 is closed, e.g. sealed, capped, etc. In certain embodiments, the second end 18 comprises a spindle 32, as described in further detail below. When present, the spindle 32 is typically cylindrical in shape, but is not otherwise limited with regard to length, width (e.g. diameter), etc.

The nozzle core 12 includes a vane 34 extending outwardly from the first end 16 of the sprayer shaft 14. As will be understood in view of the description herein, the vane 34 is adapted to receive media/fluid (e.g. at the impingement surface 36) to rotationally bias the nozzle core 12 to an activated position, as described in further detail below. More specifically, as will be understood by those of skill in the art, the nozzle core 12 functions similarly to a turbine or other such rotary mechanical device by extracting and converting energy from a fluid flow into work (i.e., rotating the nozzle core 12 to an activated position against the biasing means 90, which is described in further detail below). As such, the vane 34 is not particularly limited in terms of dimension, shape, size, etc., may comprise any number of sides, surfaces, etc., which may each independently define or otherwise comprise protrusions, indentations, cavities, contours, etc. In certain embodiments, the vane 34 is configured as a blade, bucket, etc., or various combinations thereof, suitable for use in a turbomachine. Examples of particular configurations of the blade 34 include Pelton-type, Francis-type, and Kaplan-type, as will be understood by those of skill in the art, as well as designs similar to such configurations, or derivatives thereof. The vane 34 may extend radially or tangentially from the sprayer shaft 14, e.g. from a periphery or longitudinal end thereof, or may extend slantwise from the sprayer shaft 14 (e.g. with respect to a longitudinal and/or transverse direction).

In some embodiments, the vane 34 comprises an impingement surface 36 for receiving a fluid flow (e.g. a flow of cleaning media). The impingement surface 36 may be textured (e.g. dimpled, etc.) or untextured (e.g. smooth or substantially smooth), continuous (i.e., unbroken) or discontinuous (i.e., may comprise a vent, a port, etc.), or combinations thereof. Typically, the impingement surface 36 is oriented non-perpendicular to the axis X (i.e., to translate fluid flow into rotational motion of the sprayer shaft 14), and thus may be parallel to the axis X or offset from parallel therefrom (i.e., by from 1 to less than 90 degree less). In some embodiments, the impingement surface 36 is continuous and substantially smooth. In particular embodiments, the impingement surface 36 is oriented parallel to the axis X.

In certain embodiments, however, the sprayer shaft 14 comprises more than one of the vane 34 (i.e., a plurality of vanes 34). As will be understood by those of skill in the art in view of this disclosure, the sprayer shaft 14 may comprise any number of vanes 34, which are independently selected and may be the same as or different from any other of the vanes 34 of the sprayer shaft 14. For example, in certain embodiments, the sprayer shaft 14 comprises from 1 to 50 of the vane 34, such as from 2 to 25, alternatively from 2 to 15, alternatively from 3 to 15, alternatively from 3 to 10, alternatively 4, 5, 6, 7, 8, or 9 of the vanes 34.

The vanes 34 of the sprayer shaft 14 may be arranged in any order, e.g. based on the type(s) of vanes 34 utilized, the number of vanes 34 in the arrangement, etc. For example, in some embodiments, the sprayer shaft 14 comprises a row of the vanes 34 disposed annularly about a periphery of the sprayer shaft 14. In such embodiments, the row may comprise at least 2, alternatively at least 3, alternatively at least 4 of the vanes 34. In some such embodiments, the sprayer shaft 14 comprises more than one row, such as at least 2, alternatively at least 3, alternatively at least 5 rows of the vanes 34, which rows are each independently selected and may be the same as or different from any other of the rows (e.g. with regard to the number of vanes 34, the type(s) of vanes 34 utilized, the spacing between adjacent vanes 34, etc.). In some embodiments, each of the vanes 34 are disposed in parallel face-to-face spaced apart relation with respect to each other. The spacing between adjacent vanes 34 is not particularly limited, but is generally selected such that adjacent vanes 34 present a gap therebetween.

In certain embodiments, the nozzle core 12 includes a flange 38 disposed annularly about the sprayer shaft 14 at the first end 16. In such embodiments, the flange 38 is typically disposed between the sprayer shaft 14 and the vane(s) 34.

As will be appreciated in view of the description herein, the flange 38 is typically adapted for coupling the vane(s) 34 to the sprayer shaft 14 and/or coupling/securing the sprayer shaft 14 to the housing 44 described below, and is otherwise not particularly limited. As such, the flange 38 may generally comprise any shape, size, and/or dimension(s) suitable for performing the various functions of described herein Likewise, the flange 38 may comprise any number of sides, surfaces, etc., which may each independently define or otherwise comprise protrusions, indentations, cavities, contours, etc. For example, in certain embodiments, the flange 38 comprises a seal contour or retainer 40, which may be utilized to locate a seal 42 for providing a fluid-tight relationship between the sprayer shaft 14 and a portion of the housing 44 described below.

As introduced above, the nozzle assembly 10 comprises a housing 44. As described in further detail below, the housing comprises an inlet 46 adapted for directing media/fluid into the housing 44 (e.g. from a media/fluid source).

The housing 44 serves as an exterior body to house and/or define certain components of the nozzle assembly 10 as described below and, optionally, to connect the nozzle assembly 10 to other components and/or systems. In particular, the housing 44 is adapted to be rotatably coupled to the nozzle core 12 and enclose at least the first end 16 of the sprayer shaft 14 and the vane(s) 34 thereof. As will be understood by those of skill in the art in view of this disclosure, aside from the particular features described herein, the housing 44 is not particularly limited (e.g. in terms of shape, dimension, additional functions, etc.), and will be selected and/or configured by those of skill in the art, e.g. in view of the particular nozzle core 12 utilized, a planned use of the nozzle assembly 10, etc.

The housing 44 may be monolithic in construction (i.e., comprise but one piece, or multiple pieces that are permanently joined together) or, alternatively, may comprise multiple pieces that are releasably, removeably, or semi-permanently coupled or connected together. When the housing 44 comprises multiple pieces/components, the housing may be assembled by coupling together the pieces/components using any suitable mechanical coupling or other interlock, such as a snap fit coupling or joint. In certain embodiments, one or more pieces/components of the housing 44 can be integrally formed with one another, such as by plastic injection molding.

The housing 44 typically comprises a hub 48, as shown in the embodiments illustrated in FIGS. 1, 2, and 4-6. In general, the hub 48 is configured to be disposed about the first end 16 of the sprayer shaft 14, including the port 28, as well as the vane(s) 34. In particular, the hub 48 is adapted to locate the vane(s) 34 of the nozzle core 12 in-line with the inlet 46, such that fluid (e.g. cleaning media) passed into the housing 44 via the inlet 46 contacts the impingement surface 36 of the vane(s) 34, as described in further detail below. Additionally, the nozzle assembly 10 comprises the hub 48 in sealed relation with the inlet 46 and the sprayer shaft 14 of the nozzle core 12, such that fluid passed into the housing 44 via the inlet 46 ingresses the hub 48 and egresses via the port 28 into the duct 26. Aside from the particular features described herein, the hub 48 is not particularly limited (e.g. in terms of shape, dimension, additional functions, etc.), and will be selected and/or configured by those of skill in the art, e.g. in view of the particular nozzle core 12 utilized, the configuration of the inlet 46, other components of the housing 44, etc.

In general, the hub 48 defines a chamber 50, which is adapted to be disposed about and located the portions of the nozzle core 12 as described above. The chamber 50 is not limited with regard to shape or size, but is typically oversized with regard to the nozzle core 12, i.e., to allow for rotational movement thereof without the vane(s) 34 contacting the interior surface of the chamber 50, and allow for fluid flow into the duct 26 via the port 28. However, the hub 48 need to be grossly oversized with respect to the nozzle core 12, but instead may be minimally dimensioned to account for the functions above while minimizing the internal volume (e.g. to decrease the fluid needed to operate the nozzle assembly 10 as described below).

Figure 5:
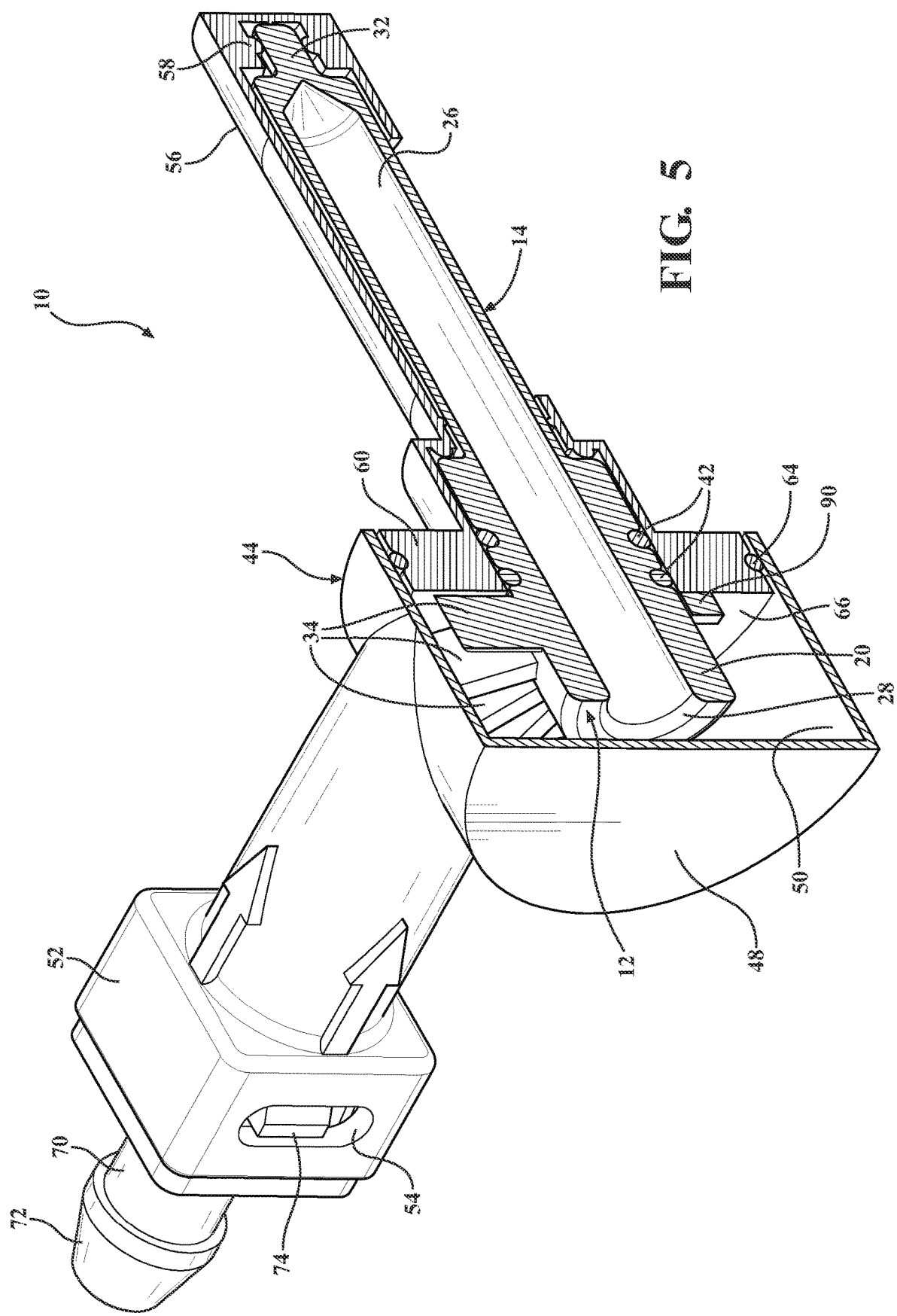
FIG. 5 is an partial cross-sectional view of an outlet portion of the nozzle assembly.

In certain embodiments, the hub 48 comprises a receiver 52 adapted to be coupled to another component of the housing 44, the nozzle assembly 10, and/or an external component described below. In particular embodiments, the hub 48 comprises connection means 54, which is/are means for securing additional components to a portion thereof. For example, as shown in FIGS. 4-5, in certain embodiments, the hub 48 comprises connection means 54 at the receiver 52 (e.g. illustrated as latch acceptor 54 at the receiver 52). Suitable connection means include fasteners (e.g. threaded fasteners such as bolts, screws, etc., push fasteners, clamp fasteners, etc.) connectors (e.g. quick connectors, threaded connectors/connections, etc.), couplings (e.g. male-female couplings, press-couplings, etc.) clamps, adhesives, and the like, as well as various combinations thereof. It is to be understood, however, that other components connectible to the hub 48 (e.g. via the receiver 52) will generally comprise a tubular structure to allow for passage of media/fluid into the inlet 46, such that suitable connection means may comprise any type of fastener/connector/coupling that allows for fluid ingress into the hub 48.

While not shown, in certain embodiments the hub 48 comprises one or more stop elements adapted to limit the rotation of the nozzle core 12 therein. For example, in certain embodiments, the stop elements are disposed in the chamber 50 annularly about the first end 16 of the sprayer shaft 14 such that the vane(s) 34 or another portion of the nozzle core 12 contacts the stop element when rotated far enough in the direction of the stop element. The number, configuration, and placement of such stop elements is not limited, and will be selected by one of skill in the art in view of the description herein.

In certain embodiments, the housing 44 comprises a seat 56, as shown in the embodiments illustrated in FIGS. 1, 2, and 4-6. In general, the seat 56 is configured to be disposed about at least a portion of the sprayer shaft 14 of the nozzle core 12 between the first and second ends 16, 18 thereof, optionally about the second end 18 of the sprayer shaft 14 itself. The seat 56 is adapted to house and/or support the portion of the sprayer shaft 14 disposed exterior the hub 48. For example, in certain embodiments, the seat 56 includes an interior bearing 58 adapted to be disposed about the spindle 32 of the sprayer shaft 42. In some embodiments, the bearing 58 and the spindle 32 are cooperatively adapted to be rotationally coupled together (e.g. via a detent, etc.). In some embodiments, the seat 56 extends axially from the hub 48 (e.g. along the assembly axis X), such that the seat 56 and the nozzle core 12 are disposed in coaxial relation.

Aside from the particular features described herein, the seat 56 is not particularly limited (e.g. in terms of shape, dimension, additional functions, etc.), and will be selected and/or configured by those of skill in the art, e.g. in view of the particular nozzle core 12 utilized (i.e., the dimensions/shape of the sprayer shaft 12 thereof), the configuration of the hub 48, other components of the housing 44, etc. In some embodiments, as shown with particularity in FIGS. 4-5, the nozzle assembly 10 comprises the seat 56 as a separate component in sealed relation with the hub 48. For example, in certain embodiments the seat 56 comprises a flange 60 adapted to be disposed in sealed relation with the hub 48. In some such embodiments, the flange 60 comprises a seal contour or retainer 62, which may be utilized to locate a seal 64 for providing a fluid-tight relationship between a periphery of the flange 60 of the seat 56 and an interior surface of the chamber 50 of the hub 48. In this fashion, the flange 60 of the seat 56 acts as a sidewall 66 of the hub 48, i.e., closing an open side of the chamber 50 about the nozzle core 12.

As described above, the seat 56 is adapted be disposed about the sprayer shaft 14 of the nozzle core 12, which comprises the outlet(s) 30. Accordingly, as shown in the embodiments illustrated in FIGS. 1, 2, and 4-6, the seat 56 typically defines an outlet window 68, which is adapted to be radially aligned about the portion of the sprayer shaft 14 comprising the outlet(s) 30 to allow for passage of media/fluid therefrom. As will be understood in view of the description herein, the window 68 is dimensioned to allow for media/fluid passage from the outlet(s) when the nozzle core 12 is in various rotational positions, including the home position, described in further detail below.

In certain embodiments, as shown with particularity in FIGS. 4 and 6, the housing 44 comprises an adapter 70. In general, the adapter 70 is configured to be disposed adjacent the receiver 52 of the hub 48, e.g. to provide a connection/attachment point 72 (i.e., "attachment 72") for an external component (e.g. a media/fluid source). The attachment 72 is not particularly limited, and is typically configured as a male or female coupling adapted to be connected/coupled to an external component (e.g. a hose connected to a fluid source, etc.).

Figure 1:
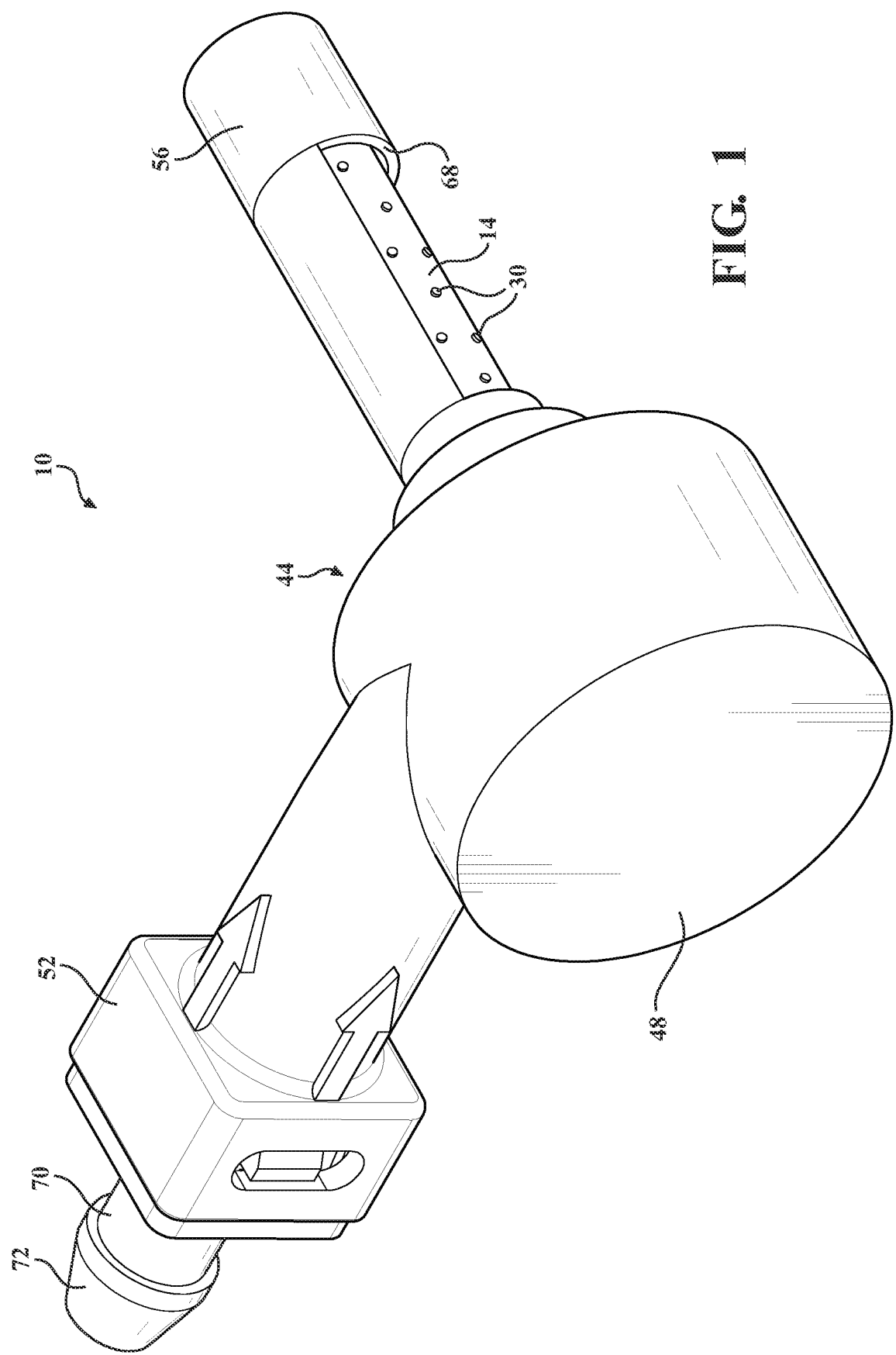
FIG. 1 is a perspective view of a nozzle assembly in accordance with this disclosure.

Typically, the nozzle assembly 10 comprises the adapter 70 coupled to the hub 48. For example, in certain embodiments the nozzle assembly 10 comprises the adapter 70 as a separate component releasably coupled to and in sealed relation with the receiver 52 of the hub 48. In particular embodiments, the adapter 70 comprises connection means 72, which is/are means for securing the adapter 70 to the hub 48 (e.g. via the receiver 52). For example, as shown in FIGS. 1 and 4-5, in certain embodiments, the adapter 70 comprises connection means 74 (e.g. illustrated as latch 74) adapted for releasably coupling/connecting together the adapter 70 and the hub 48. In such embodiments, the suitable connection means include fasteners (e.g. threaded fasteners such as bolts, screws, etc., push fasteners, clamp fasteners, etc.) connectors (e.g. quick connectors, threaded connectors/connections, etc.), couplings (e.g. male-female couplings, press-couplings, etc.) clamps, adhesives, and the like, as well as various combinations thereof. Accordingly, it is to be understood that the housing 44 of the nozzle assembly 10 may comprise both connection means 54 and 74, which may be cooperatively adapted to engage one another to couple/connect together the adapter 70 and the hub 48.

Aside from the particular features described herein, the adapter 70 is not particularly limited (e.g. in terms of shape, dimension, additional functions, etc.), and will be selected and/or configured by those of skill in the art, e.g. in view of the configuration of the hub 48, other components of the housing 44, external components to be connected thereto, etc. As will be appreciated from the description herein, the adapter 70 is configured for media/fluid passage therethough, i.e., such that fluid can be passed through the adapter 70 and to the inlet 46. As such, the adapter 70 itself comprises an inlet 76, an outlet 78, and internal duct 80 in fluid communication with the inlet 76 and outlet 78. The inlet 76 is typically disposed in the attachment 72, while the outlet 78 is typically disposed in a neck 82 (e.g. in a longitudinal end or a peripheral side thereof).

In certain embodiments, the adapter 70 comprises a check valve, which is illustrated and generally designated at 84 in FIG. 4. The check valve 84 is configured for unidirectional flow into the housing 44 (e.g. from the inlet 76 of the adapter 70), i.e., preventing backflow from the hub 48 and/or sprayer shaft 14 out the inlet 46 and through the adapter 70. Aside from this function, the check valve 84 is not particularly limited, and may comprise any components and/or configurations suitable for use in/as a check valve known in the art. In certain embodiments, the check valve 84 comprises an elastically deformable sleeve 86 configured to be disposed about the neck 82. In such embodiments, the neck 82 acts as a valve stem and the sleeve 86 as a gate to interfere with passage of media/fluid through the adapter 70 (i.e., out of the outlet 78 disposed on a peripheral/lateral side of the neck 82) by movement into or out of a valve seat 88, e.g. formed in the receiver 52 of the hub 48. It is to be appreciated that other styles/configurations of check valves may also be employed and/or utilized in the nozzle assembly 10, compose a portion of the adapter 70, the hub 48, and/or another component of the housing 44, and/or comprise additional component parts such as return springs, plungers, diaphragms, etc.

As introduced above, the housing 44 comprises the inlet 46, which is adapted for directing media/fluid into the housing 44 (e.g. from a media/fluid source via the adapter 70). More specifically, the inlet 46 is disposed in-line with the vane(s) 34 and adapted to direct fluid to the impingement surface 36 thereof. Aside from that function, the inlet 46 is not particularly limited in terms of dimension, shape, size, etc., and may comprise any number of sides, surfaces, etc., which may each independently define or otherwise comprise protrusions, indentations, cavities, contours, etc. Likewise, the inlet 46 may compose any part of the housing 44. For example, in certain embodiments, the hub 48 comprises the inlet 46, e.g. as a unique component coupled/connected/fixed to a portion of the hub 48 (e.g. the receiver 52), or integrally formed with such a portion. In other embodiments, the adapter 70 comprises the inlet 46, e.g. as a unique component coupled/connected/fixed to a portion of the adapter 70 (e.g. the neck 82), or integrally formed with such a portion. In certain embodiments, the inlet 46 is configured as a duct defined by the hub 48, as illustrated in FIG. 6.

As introduced above, the nozzle assembly 10 comprises means 90 for rotationally biasing the nozzle core 12 to a home position within the housing 44 (i.e., biasing means 90) described in further detail below. The biasing means 90 is not particularly limited, and may comprise, or be, any means for rotationally biasing the nozzle core 12 toward the home position. Examples of suitable biasing means include springs (e.g. coil springs, torsion springs, compression springs, clock springs, leaf springs, etc.), levers, resiliently flexible/deformable materials, etc. As such, the biasing means 90 may comprise, alternatively may be a spring mechanism, In certain embodiments, as shown with particularity in FIGS. 4-6, the nozzle assembly 10 comprises the biasing means 90 within the chamber 50 of the hub 48 and engaged with a portion of the nozzle core 12 disposed therein (e.g. the first end 16 of the sprayer shaft, the flange 38, and/or the vane 34. In some embodiments, the biasing means 90 comprises a spring disposed about a peripheral portion of the first end 16 of the sprayer shaft 14. However, it is to be appreciated that the biasing means 90 may be disposed anywhere within the housing 44 and/or within the nozzle core 12.

The various component parts of the nozzle assembly 10 described above (e.g. the nozzle core 12, the housing 44, etc.), and portions of such component parts (e.g. the sprayer shaft 14 and vane(s) 34 of the nozzle core 12, the hub 48, seat 56, and adapter 70 of the housing 44, etc.) may be manufactured of the same or different material(s), such as any one or more of the materials described below.

For example, in some embodiments, the nozzle core 12 is monolithic in construction and substantially homogeneous in composition with respect to the sprayer shaft 14, the vane(s) 34 and, when present, the flange 38. Likewise, in some embodiments, the housing 44 is monolithic in construction and substantially homogeneous in composition with respect to the hub 48 and, where present, the seat 56 and/or adapter 70. However, the nozzle core 12 and or the housing 44 may independently comprise multiple component parts of varying compositions joined together. Moreover, each component part may itself comprise a combination of different materials, and thus may not comprise a homogeneous composition throughout. For example, in certain embodiments, the housing 44 comprises the adapter 70 and/or the seat 56 as individual components joined to a monolithic construction comprising the hub 48.

In general, materials suitable for use in or as the nozzle assembly 10 and/or the component parts thereof (e.g. the nozzle core 12, the housing 44, the biasing means 90, and the various portions thereof) include metals (e.g. steels, aluminums, alloys, etc.), resins (e.g. thermoset and/or thermoplastic resins), and combinations thereof. However, myriad materials may be used to manufacture the component parts and various elements of the nozzle assembly 10, with each typically being selected as a function of availability, cost, performance/end use applications, etc. As such, metals, metal alloys, and resins are not exhaustive of suitable materials that may be used. Additionally, it is to be appreciated a surface or portion thereof of a particular component part of the nozzle assembly 10 may be coated, painted, and/or impregnated with a material having desired characteristics including, but not limited to, those described above or below. Moreover, one of skill in the art will readily appreciate that particular materials will be selected based on the features and/or functions of the nozzle assembly 10 or particular component parts thereof (e.g. the flexibility and resiliency of the biasing means 90, connection means 54/74, etc., and the resiliency and directional deformability of the seals 42/64, etc.).

In various embodiments, the nozzle assembly 10 comprises a resin. Examples of suitable resins typically comprise the reaction product of a monomer and a curing agent, although resins formed of self-polymerizing monomers (i.e., those acting as both a monomer and a curing agent) may also be utilized. It is to be appreciated that such resins are conventionally named/identified according to a particular functional group present in the reaction product. For example, the term "polyurethane resin" represents a polymeric compound comprising a reaction product of an isocyanate (i.e., a monomer) and a polyol (i.e., a chain extender/curing agent). The reaction of the isocyanate and the polyol create urethane functional groups, which were not present in either of the unreacted monomer or curing agent. However, it is also to be appreciated that, in certain instances, resins are named according to a particular functional group present in the monomer (i.e., a cure site). For example, the term "epoxy resin" represents a polymeric compound comprising a cross-linked reaction product of a monomer having one or more epoxide groups (i.e., an epoxide) and a curing agent. However, once cured, the epoxy resin is no longer an epoxy, or no longer includes epoxide groups, but for any unreacted or residual epoxide groups (i.e., cure sites), which may remain after curing, as understood in the art. In other instances, however, resins may be named according to a functional group present in both the monomer and the reaction product (i.e., an unreacted functional group).

In some embodiments, the resin is selected from thermoset resins and thermoplastic resins. Examples of suitable thermoset and/or thermoplastic resins typically include polyamides (PA), such as Nylons; polyesters such as polyethylene terephthalates (PET), polybutylene terephthalates (PBT), polytrimethylene terephthalates (PTT), polyethylene naphthalates (PEN), liquid crystalline polyesters, and the like; polyolefins such as polyethylenes (PE), polypropylenes (PP), polybutylenes, and the like; styrenic resins; polyoxymethylenes (POM) such as acetal homopolymer; polycarbonates (PC); polymethylmethacrylates (PMMA); polyvinyl chlorides (PVC); polyphenylene sulfides (PPS); polyphenylene oxide (PPO), polyphenylene ethers (PPE); polyimides (PI); polyamideimides (PAI); polyetherimides (PEI); polysulfones (PSU); polyethersulfones; polyketones (PK); polyetherketones (PEK); polyetheretherketones (PEEK); polyetherketoneketones (PEKK); polyarylates (PAR); polyethernitriles (PEN); resol-type; epoxy resins, urea-type (e.g. melamine-type); phenoxy resins; fluorinated resins, such as polytetrafluoroethylenes; thermoplastic elastomers, such as polystyrene types, polyolefin types, polyurethane types, polyester types, polyamide types, polybutadiene types, polyisoprene types, fluoro types, and the like; and copolymers, modifications, and combinations thereof. Particular resins will be selected by those of skill in the art, e.g. based on material to be mixed, environment in which the nozzle assembly 10 is to be used, the manufacturing method(s) and/or technique(s) selected to prepare the nozzle assembly 10 and/or the component parts thereof (e.g. the nozzle core 12, the housing 44, the biasing means 90, and the various portions thereof), etc.

Figure 2A:
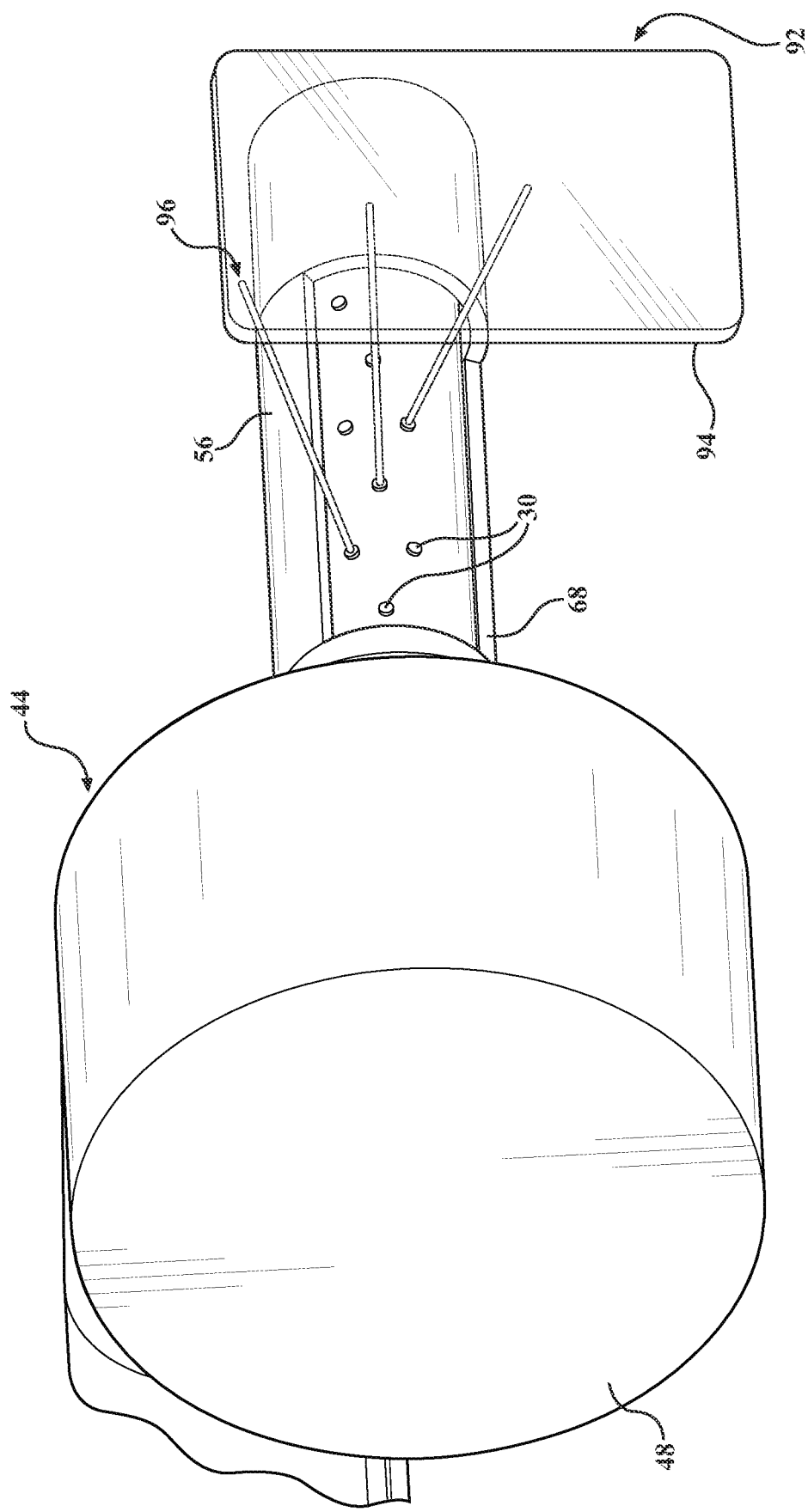
FIG. 2A is a partial perspective view of the nozzle assembly operating in a home position to spray a portion of a surface.
Figure 2B:
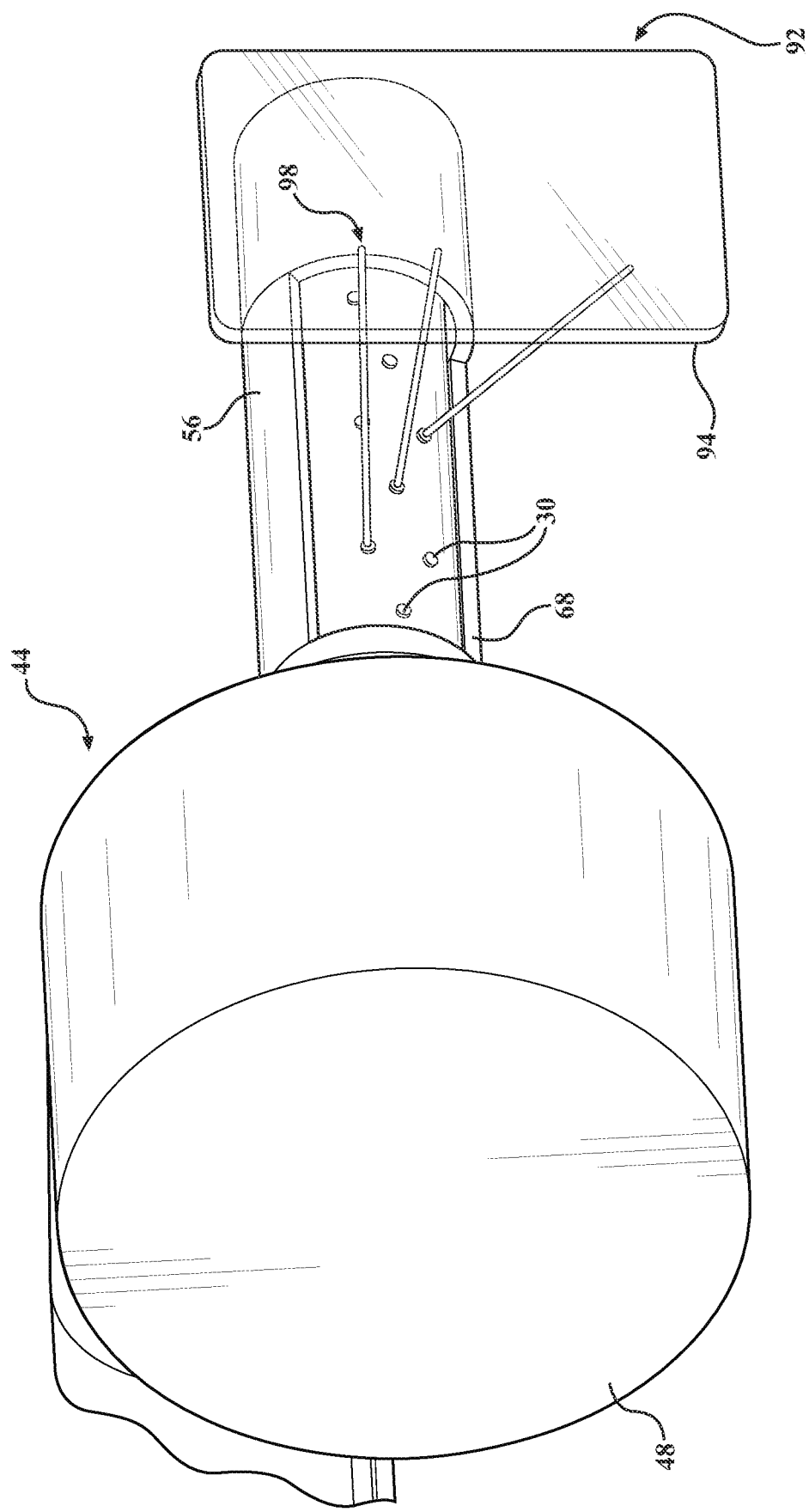
FIG. 2B is a partial perspective view of the nozzle assembly operating in an activated position to spray another portion of the surface.
Figure 6A:
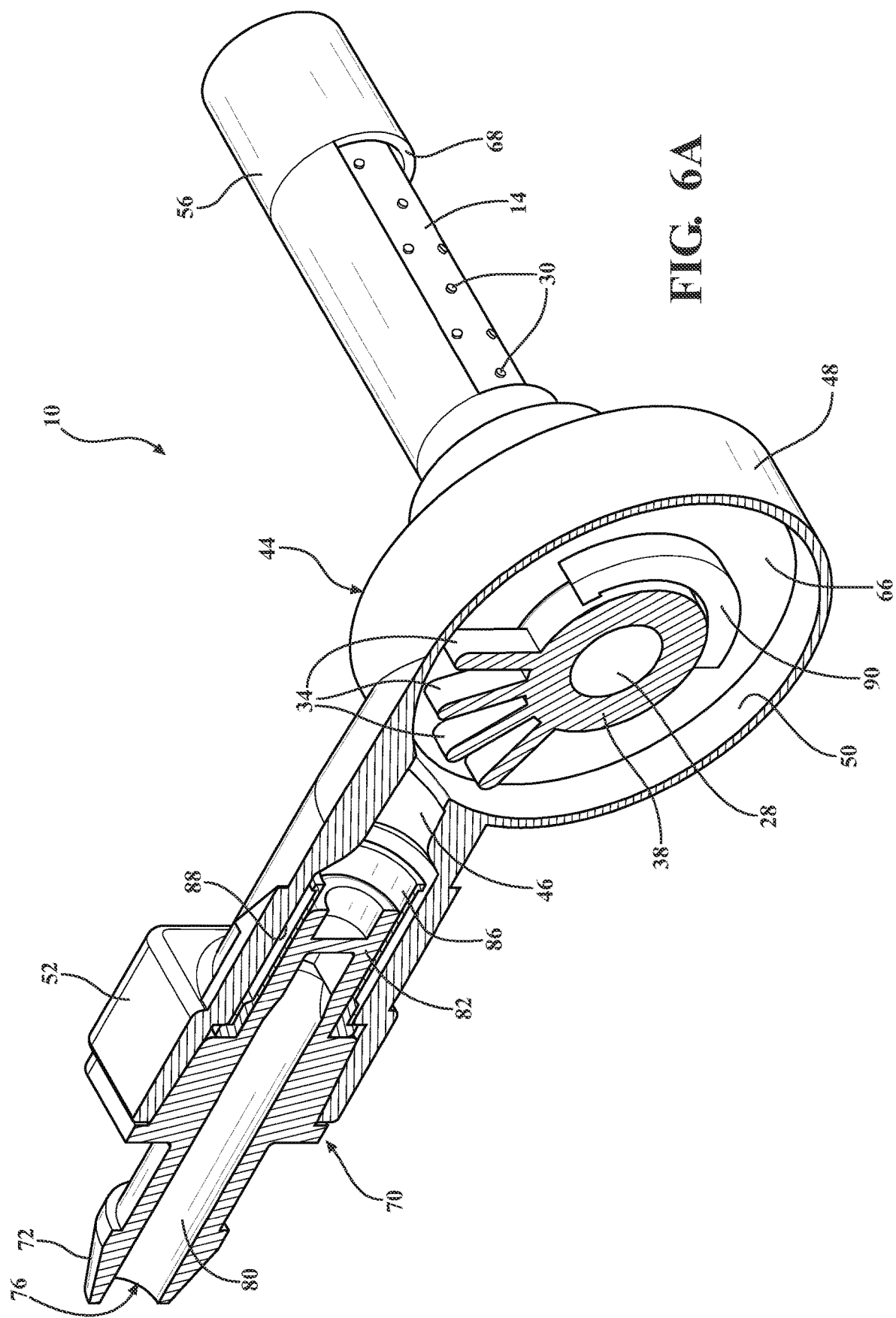
FIG. 6A is a partial cross-sectional view of an inlet portion of the nozzle assembly, showing the nozzle assembly operating in the home position.
Figure 6B:
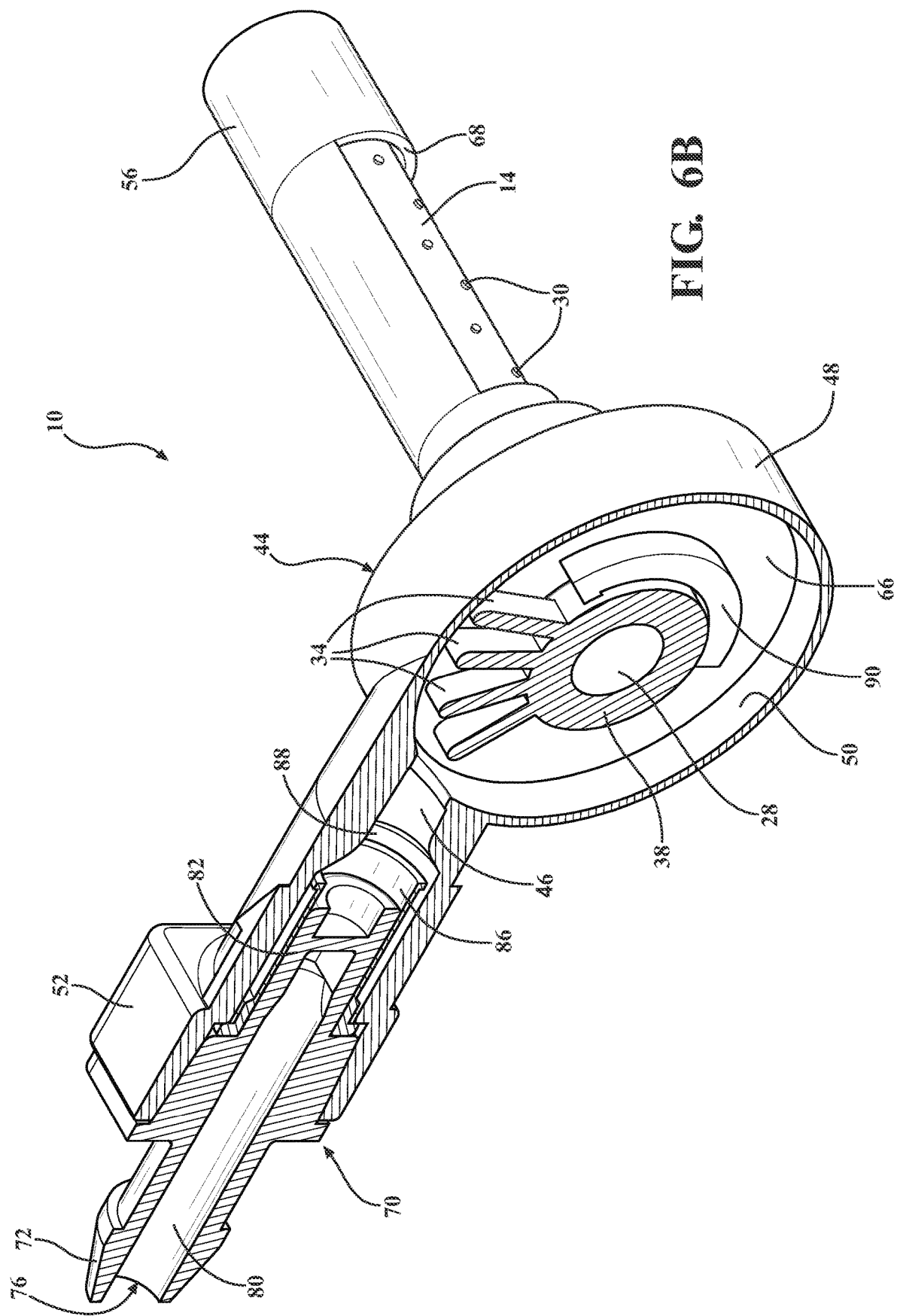
FIG. 6B is the partial cross-sectional view of FIG. 6A, showing the nozzle assembly operating in the activated position.

As introduced above, the nozzle core 12 and the housing 44 are rotatably coupled together in the nozzle assembly 10 such that the nozzle core 12 can be rotated between a home position (e.g. as shown in FIGS. 2A and 6A) and an activated position (e.g. as shown in FIGS. 2B and 6B). In operation, the biasing means 90 functions to bias the nozzle core 12 in a first direction toward the home position (i.e., biases the impingement surface 36 of the vane(s) 34 toward alignment with the inlet 46), such that media/fluid passed through the inlet 46 initially contacts the impingement surface 36 of the vane(s) 34. Such contact functions to bias the nozzle core 12 in a second direction, opposite the first direction and toward the activated position (i.e., biases the impingement surface 36 of the vane(s) 34 away from alignment with the inlet 46). After media/fluid passed through the inlet 46 contacts the vane(s) 34, such media is contained within the chamber 50 of the hub 48 until passed into the duct 26 of the sprayer shaft 14 (e.g. via the port 28) and through the outlet(s) 30 (i.e., as a jet, spray, etc.). It is to be understood however, that such rotation movement of the nozzle core 12 and media jetting/spray are not mutually exclusive, such that upon passage of media into the hub 48 (e.g. via the inlet 46), the nozzle core 12 may rotate and expel the media concurrently. The rotational movement of the nozzle core 12 between home position and the activated position may be controlled by the configuration of the nozzle assembly 10, e.g. via independently selecting the force at which media is passed through the inlet 46 (e.g. via fluid pressure, size of the inlet 46, etc.), the internal volume of the chamber 50 and volume of media utilized (e.g. to control internal media/fluid pressure within the nozzle assembly 10), the strength of the biasing means 90 utilized, the duration and/or flow of media passage into the hub 48, the size/diameter of the outlet(s) 30, etc., as well as various combinations thereof.

As also introduced above, the nozzle assembly 10 is adapted to direct a stream of media (e.g. via each of the outlet(s) 30) into contact with multiple portions of an object to be cleaned. For example, as shown in FIG. 2, during operation the nozzle assembly 10 is disposed near an object, illustrated generally at 92, comprising a surface 94 to be cleaned. As media is initially passed into the hub 48 (e.g. via the inlet 46), such media is ultimately expelled from the nozzle core 12 (e.g. via the outlet(s) 30) while the nozzle core 12 is initially in the home position (e.g. as illustrated in FIG. 2A). Such media passage ultimately works against the vane(s) 34 to rotate the nozzle core 12 from the home position and toward the activated position, changing the orientation of the outlet(s) 30 with respect to the housing 44 (e.g. the window 68 of the seat 56) and thus the direction of media expulsion from the outlet(s) 30, until the nozzle core 12 is rotated into the activated positon (e.g. as illustrated in FIG. 2B). This rotation movement of the nozzle core 12, and the corresponding arc of the outlet(s) 30, provides a stream of media onto multiple points of impact on the surface 94, including an initial point 96 corresponding to the home position and a final point 98 corresponding to the activated position, as well as various points along a path therebetween (not shown).

It will be appreciated that the difference between the home and activated positions may be measured/determined in various ways depending on the portion(s) of the nozzle assembly 10 utilized. For example, in some embodiments, the home and activated positions may be measured/defined by the travel of a radial line extending from the axis X through the outlet 30 during operation, i.e., the arc length defined by a central angle between the radial line at the home position and the radial line at the activated position. In certain embodiments, the home and activated positions differ by up to $\pi$ radians, i.e., where the nozzle core 12 rotates up to 180 degrees within the housing 44 from the home position to the activated position. For example, in some such embodiments, the home and activated positions differ, e.g. are separated by, from greater than 0 to $\pi$ radians (i.e., >0 to ≤180 degrees), such as from >0 to ≤5$\pi$/6, alternatively from >0 to ≤3$\pi$/4, alternatively from >0 to ≤2$\pi$/3 radians.

In some embodiments, the home and activated positions differ by up to $\pi$/2 radians, i.e., where the nozzle core 12 rotates up to 90 degrees within the housing 44 from the home position to the activated position. For example, in some such embodiments, the home and activated positions differ, e.g. are separated by, from greater than 0 to $\pi$/2 radians (i.e., >0 to 90 degrees), such as from >0 to ≤π/3, alternatively from >0 to ≤π/4, alternatively from >0 to ≤π/6, alternatively from >0 to ≤π/8, alternatively from >0 to ≤π/10, alternatively from >0 to ≤π/12 radians.

Figure 7:
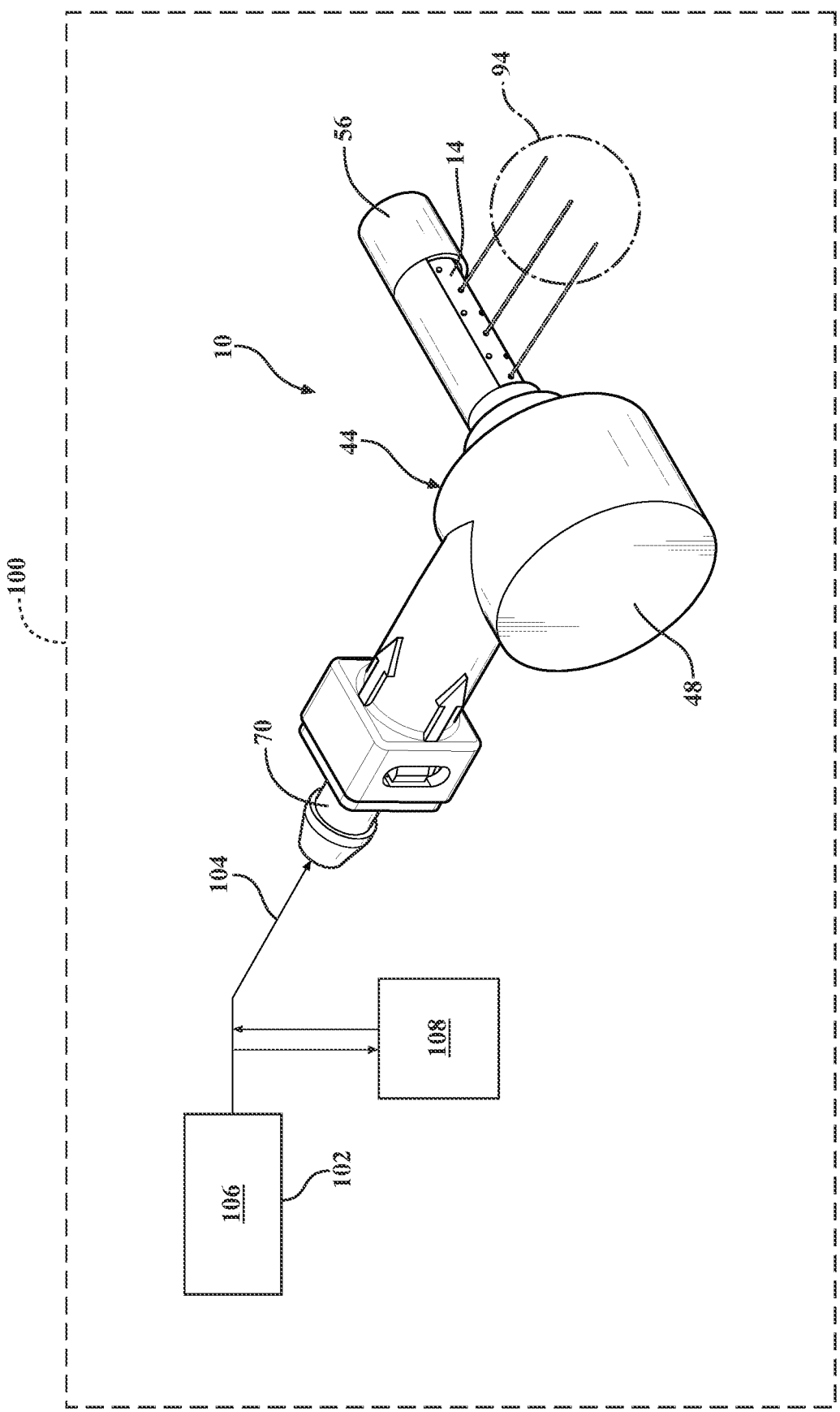
FIG. 7 is a schematic illustration of a system including the nozzle assembly.

A system 100 comprising the nozzle assembly 10 is also provided, and illustrated schematically in FIG. 7. The system 100 includes the nozzle assembly 10, a media/fluid source/supply 102, and a media flow path 104 supplying a media/fluid 106 (e.g. cleaning media) from the media source 102 to the inlet 46 of the housing 44.

In certain embodiments, the media flow path 104 supplies the media 106 to the housing 44 via the adapter 70, as described above. In some such embodiments, the nozzle assembly 10 comprises the check valve 84 to control the flow of the media 106 through the nozzle assembly 10. The nozzle assembly 10 is positioned to deliver the media 106 to the surface 94 of the object 82 to be cleaned.

Typically, the media 106 is put under pressure from an external system, e.g. a pump or compressor (not shown). The pressure is not limited, and will be selected in view of the nozzle assembly 10, e.g. the pressure/volume/flowrate necessary to operate the nozzle assembly 10 as described above (i.e., rotate the nozzle core from the home position to the activated position and deliver the media 106 to the surface 94). For example, the operating may be from greater than 0 to 20 bar, such as from 1 to 15, alternatively from 1 to 10 bar, inclusive. However, it is to be appreciated that pressures outside these ranges may also be utilized. Likewise, such operating pressures may differ along the system 100, such that the operating pressure within the housing 44 of the nozzle assembly 10 may be greater than or less than the pressure at the media/fluid source 102 and/or pump/compressor (not shown).

The system 100 may comprise any number of additional components aside from those particularly described herein. For example, in certain embodiments, the system 100 comprises a heating element 108 for heating the media 106 before it is applied to the surface 94. Of course, any number of conduits, ducts, tubing, hoses, fluid connectors, valves, controllers, and/or manifolds (not shown) may also be utilized to fluidly couple the various components of the system 100 together and/or provide the media flow path 104 from the media/fluid source 102 thereof.

The system 100 is not limited to any particular application, or with regard to any particular media 106. Suitable media are generally fluids, i.e., liquids, air, gasses, and mixes thereof, as well as fluid suspensions comprising solid particles. Examples of such fluids include various cleaning media known in the art, such as cleaning solutions (e.g. comprising soaps, surfactants, solvents, etc.), rinsing solutions (e.g. comprising water, rinsing aids, drying aids, etc.), drying fluids (e.g. air, etc.) and the like, as well as derivatives, modifications, and combinations thereof. The system 100 is also not limited with regard to being utilized to deliver the media 106 to a particular surface 94 of any particular object 92, as will be appreciated from the description herein.

Figure 8:
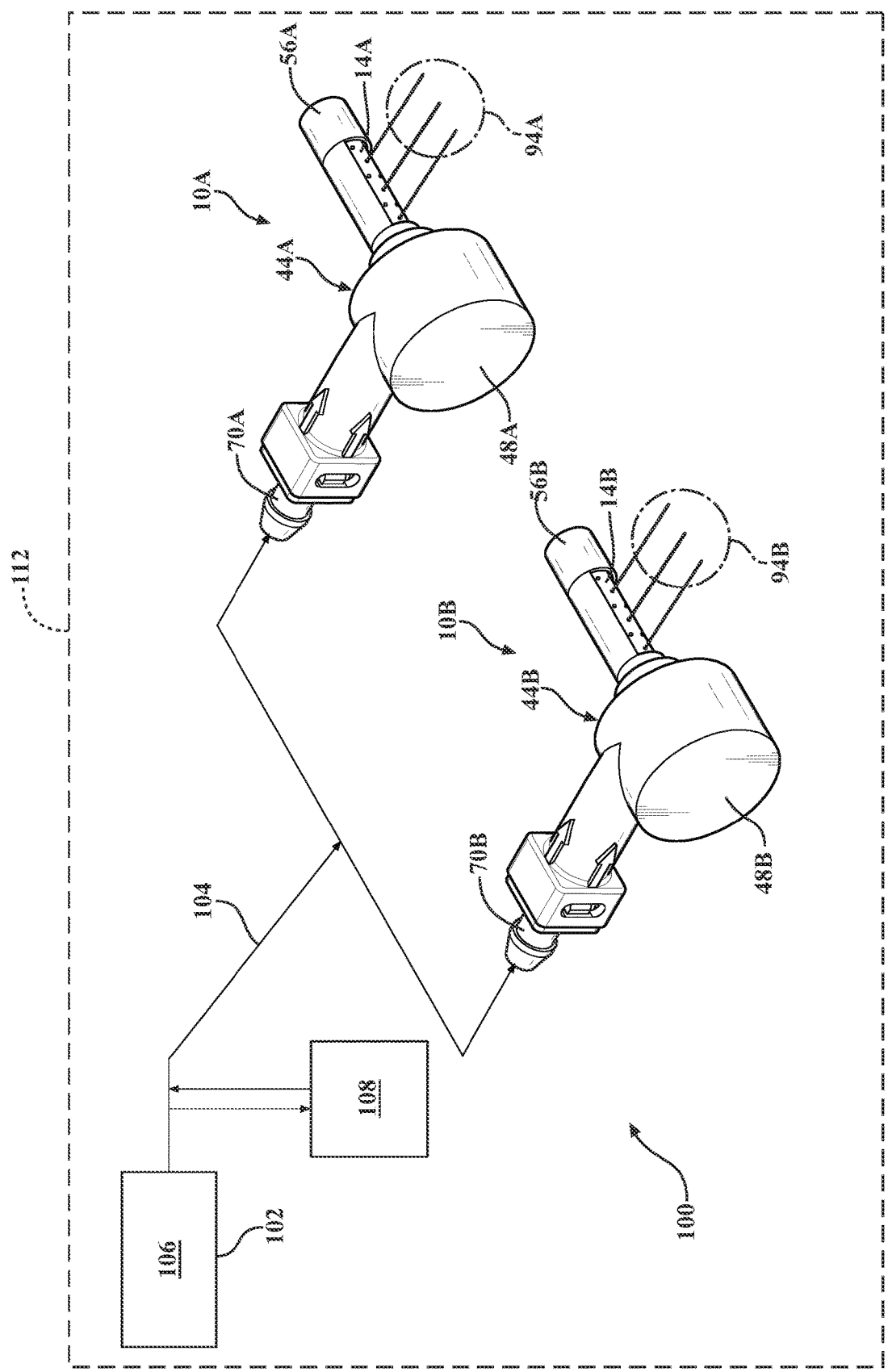
FIG. 8 is a schematic illustration of a vehicle including the nozzle assembly system.
Figure 9:
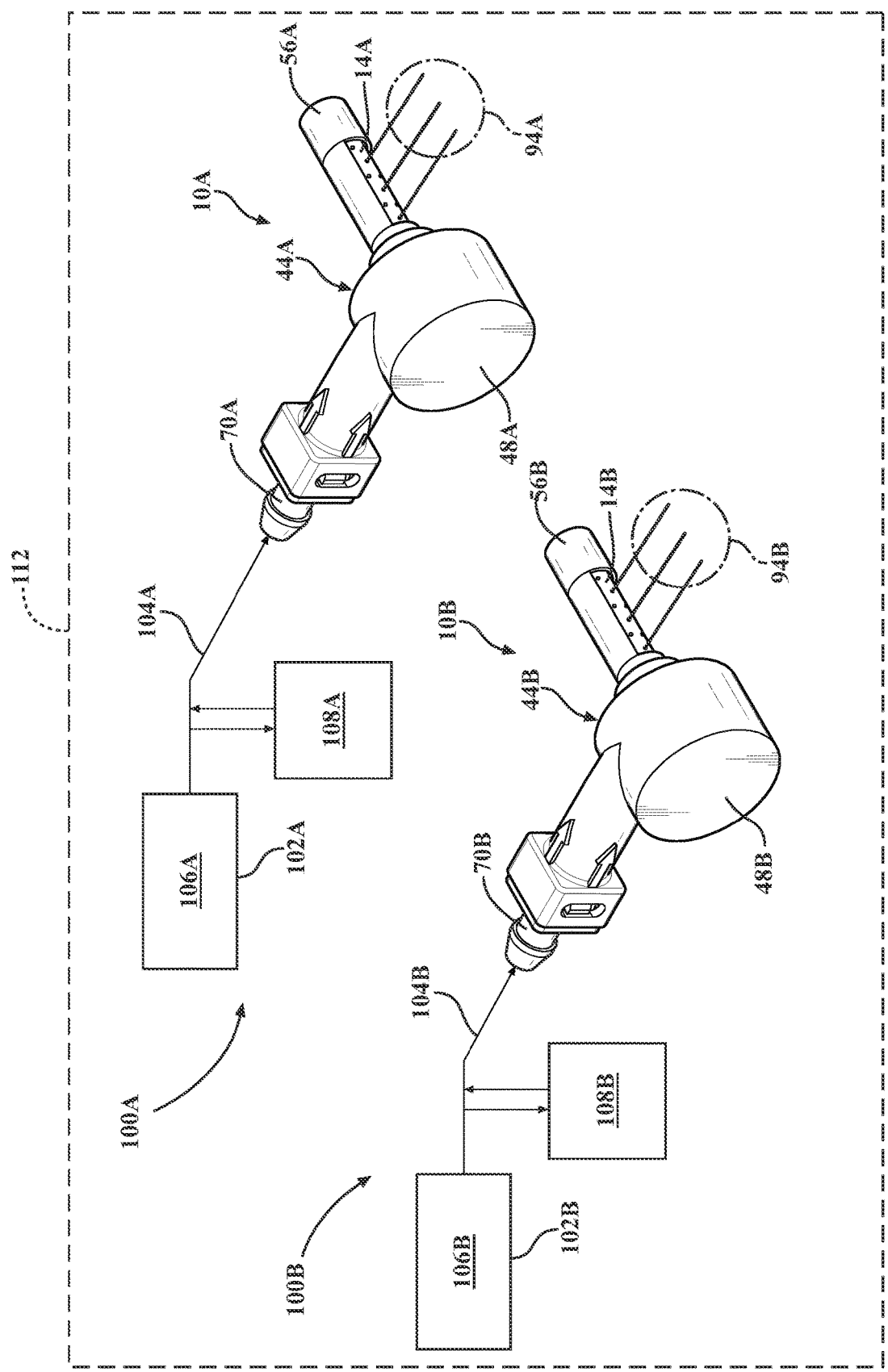
FIG. 9 is a schematic illustration of another vehicle including the nozzle assembly system.

In certain embodiments, the system 100 comprising the nozzle assembly 10 is adapted or otherwise configured for cleaning a surface of a vehicle, such as the vehicle illustrated schematically and generally designated at 112 in FIGS. 8-9. In such embodiments, the nozzle assembly 10 may be provided on the vehicle 112 in various locations to the clean various surfaces thereof. For example, the nozzle assembly 10 can be hood mounted, under hood mounted, cowl screen mounted, wiper arm mounted, integrated in or mounted on/to a rear end spoiler or a center high-mounted stop lamp (CHMSL), bumper, trunk, door, etc. The nozzle assembly 10 may be mounted in concealed fashion, or near-concealed fashion, for example within a bumper or panel of the vehicle 112. However, the vehicle 112 may comprise the surface 94 as part of any object 92, such as a component of a camera, sensor, front windshield, rear windshield, headlight or headlamp, and the like, such that the nozzle assembly 10 may be fixed to a structure of the vehicle 112 near such a component to be cleaned without regard to concealment.

The system 100 may comprise but one of the nozzle assembly 10, such as illustrated by the schematic of the system 100 shown in FIG. 7 or, alternatively, may comprise two or more nozzle assemblies 10 as shown in FIGS. 8-9. Likewise, it is to be appreciated that any number of nozzle assemblies 10 and/or systems 100 may be utilized, e.g. on a single vehicle 112. For example, in particular embodiments, as illustrated by the schematic of FIG. 8, the vehicle 112 comprises the system 100, which includes two nozzle assemblies 10 designated separately as "10A" and "10B" for distinction. In such embodiments, the nozzle assemblies 10A, 10B may be connected to a common media source 102, optionally to a common heating element 108, along the media flow path 104. When more than one of the nozzle assemblies 10 is utilized, each of the nozzle assemblies 10 (e.g. 10A, 10B, etc.) is independently selected and may be the same or substantially the same, or different from one another, e.g. with respect to size, dimension, positioning, rotation (e.g. between the home and activated positions), etc.

In some embodiments, as illustrated by the schematic of FIG. 9, the vehicle 112 may comprise at least two systems 100, designated separately as "100A" and "100B" for distinction. In such embodiments, the systems 100A, 100B are independently selected, and may be the same or substantially the same, or different from one another, e.g. with respect to media source 102, the type of media 106 utilized, the presence and/or parameters of the heating element 108, the number of nozzle assemblies 10 utilized, etc.

It is to be appreciated that the operation of the nozzle assembly 10 and/or the system 100 comprising the same may be initiation, controlled, and or terminated by various methods and techniques known in the art. For example, while not shown, the system 100 may comprise a valve connected to a controlled power supply, such that an open/close status of the valve can be controlled on demand from a control unit (not shown). In this fashion, the supply of media to the nozzle assembly 10 can be automated (e.g. with media supplied automatically at predetermined intervals or on an as-needed basis), manual (i.e., via operation of a switch, e.g. in a cabin of the vehicle 112, manually-actuatable by an operator/driver), or both.

The above description relates to general and specific embodiments of the disclosure. However, various alterations and changes can be made without departing from the spirit and broader aspects of the disclosure as defined in the appended claims, which are to be interpreted in accordance with the principles of patent law including the doctrine of equivalents. As such, this disclosure is presented for illustrative purposes and should not be interpreted as an exhaustive description of all embodiments of the disclosure or to limit the scope of the claims to the specific elements illustrated or described in connection with these embodiments. Any reference to elements in the singular, for example, using the articles "a," "an," "the," or "said," is not to be construed as limiting the element to the singular. Further, it is to be understood that the terms "right angle", "orthogonal", and "parallel" are generally employed herein in a relative and not an absolute sense.

Likewise, it is also to be understood that the appended claims are not limited to express and particular compounds, compositions, or methods described in the detailed description, which may vary between particular embodiments that fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The invention claimed is:

1. A nozzle assembly for delivering media to a surface, comprising:
   a housing having an inlet for directing media into the housing;
   a nozzle core rotatably coupled to the housing, the nozzle core comprising a sprayer shaft that defines an outlet and is adapted for passage of media from the housing through the outlet, and a vane that is coupled to the sprayer shaft and is adapted to receive media from the inlet to rotationally bias the nozzle core and radially orient the outlet to an activated position;
   the housing further including a hub disposed about the vane and a portion of the sprayer shaft that is coupled to the vane, and a seat extending axially from the hub such that the seat and the nozzle core are disposed in a coaxial relation, the seat housing the portion of the sprayer shaft that is disposed exterior the hub; and
   means for rotationally biasing the nozzle core to radially orient the outlet to a home position different than the activated position.

2. The nozzle assembly of claim 1, wherein the sprayer shaft comprises an open end comprising a port, a closed end, and a duct that extends longitudinally from the port toward the closed end and is in fluid communication with the port and the outlet to direct media from the housing via the port and out the outlet.

3. The nozzle assembly of claim 1, wherein the sprayer shaft comprises a plurality of outlets, and wherein: (i) at least two of the outlets are disposed in a row along a length of the sprayer shaft; (ii) at least two of the outlets are disposed in a column along a circumference of the sprayer shaft; or (iii) both (i) and (ii).

4. The nozzle assembly of claim 1, wherein the nozzle core comprises a flange disposed radially about the sprayer shaft, the flange extending between and coupled to the vane and the sprayer shaft within the housing.

5. The nozzle assembly of claim 1, wherein the nozzle core comprises a plurality of vanes disposed annularly about the sprayer shaft.

6. The nozzle assembly of claim 1, wherein the hub is in sealed relation with the inlet and the sprayer shaft of the nozzle core.

7. The nozzle assembly of claim 1, wherein: (i) the seat defines a window radially aligned with the outlet of the sprayer shaft to allow for passage of media therefrom when in the home position, the activated position, and therebetween; (ii) the seat is rotationally coupled to a terminal end of the sprayer shaft distal the hub; or (iii) both (i) and (ii).

8. The nozzle assembly of claim 1, wherein the housing further comprises an adapter extending radially from the hub transverse to the sprayer shaft and defining a duct in fluid communication with the inlet, the adapter being configured for receiving media from a media source.

9. The nozzle assembly of claim 8, wherein the adapter comprises: (i) a connector; (ii) a check valve; or (iii) both (i) and (ii).

10. The nozzle assembly of claim 1, wherein the rotationally biasing means comprises a spring operatively coupled to the housing and the nozzle core, and wherein: (i) the spring is disposed about the nozzle core proximal the vane; (ii) the spring is disposed within the housing; or (iii) both (i) and (ii).

11. The nozzle assembly of claim 1, wherein the nozzle core is adapted to rotate between the home and activated positions such that the outlet travels from $>0$ to $\leq \pi/2$ radians about a central axis of the sprayer shaft.

12. The nozzle assembly of claim 1, wherein one or more of: (i) the nozzle core is monolithic in construction; (ii) the housing is monolithic in construction; and (iii) the nozzle assembly comprises a polymeric material.

13. A system comprising the nozzle assembly of claim 1, a media source operatively coupled thereto, and a sensor disposed adjacent the outlet of the nozzle core such that media passed through the nozzle assembly will contact at least two portions of a surface of the sensor.

14. The system of claim 13, wherein one or more of: (i) the media is a cleaning fluid; (ii) the sensor is a camera; and (iii) the system is a vehicle component.

* * * * *